US012750494B2

(12) United States Patent
Francois et al.

(10) Patent No.: US 12,750,494 B2
(45) Date of Patent: Sep. 29, 2026

(54) VIDEO ENCODING AND DECODING USING OPERATIONS CONSTRAINT

(71) Applicant: InterDigital CE Patent Holdings, SAS, Paris (FR)

(72) Inventors: Edouard Francois, Bourg des Comptes (FR); Franck Galpin, Thorigne-Fouillard (FR); Gaëlle Martin-Cocher, Toronto (CA); Philippe De Lagrange, Betton (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/856,157

(22) PCT Filed: Apr. 4, 2023

(86) PCT No.: PCT/EP2023/058834
§ 371 (c)(1),
(2) Date: Oct. 11, 2024

(87) PCT Pub. No.: WO2023/198527
PCT Pub. Date: Oct. 19, 2023

(65) Prior Publication Data
US 2025/0254331 A1 Aug. 7, 2025

(30) Foreign Application Priority Data
Apr. 12, 2022 (EP) .................................... 22305528

(51) Int. Cl.
*H04N 19/156* (2014.01)
*H04N 19/44* (2014.01)
*H04N 19/70* (2014.01)

(52) U.S. Cl.
CPC ........... *H04N 19/156* (2014.11); *H04N 19/44* (2014.11); *H04N 19/70* (2014.11)

(58) Field of Classification Search
CPC ...... H04N 19/156; H04N 19/44; H04N 19/70; H04N 19/42
See application file for complete search history.

(56) References Cited

U.S. PATENT DOCUMENTS

2021/0306703 A1* 9/2021 Stockhammer .... H04N 21/8456
2022/0103866 A1 3/2022 Bossen

OTHER PUBLICATIONS

Takada et al. ("AHG: Complexity description for NNR post-filter SEI message"; Joint Video Experts Team (JVET) of ITU-T SG 16 WP 3 and ISO/IEC JTC 1/SC 29; 25th Meeting, by teleconference, Jan. 12-21, 2022; Document: JVET-Y0075-v3) (Year: 2022).*
(Continued)

*Primary Examiner* — Maria E Vazquez Colon
(74) *Attorney, Agent, or Firm* — Condo Roccia Koptiw LLP

(57) ABSTRACT

At least a method and an apparatus are presented for encoding or decoding video that conforms to capability constraints comprising an indication relative to a number of multiply-accumulation operations needed to decode video stream. For example, a video stream is defined that comprises coded data representative of a sequence of images, an indication of a profile to which coded data conform among a plurality of profiles, and an indication of a level to which coded data conform among a plurality of levels; wherein the plurality of profiles and the plurality of levels specify capability constraints for decoding coded data and wherein the capability constraints comprise an indication relative to a number of multiply-accumulation operations needed to decode coded data.

20 Claims, 6 Drawing Sheets

(56) References Cited

OTHER PUBLICATIONS

International Organization for Standardization, "Updated Evaluation Framework for Compressed Representation of Neural Networks", ISO/IEC JTC1/SC29/WG11, Coding of Moving Pictures and Audio, Document:N18129, Marrakech; Marocco, Jan. 2019, 12 pages.
"Infrastructure of audiovisual services—Coding of moving video, Versatile video coding", International Telecommunication Union (ITU), Series H: Audiovisual and Multimedia Systems, ITU-T Telecommunication Standardization Sector of ITU, Recommendation H.266, Aug. 2020, 513 pages.
Takada et al., "AHG9: Complexity description for NNR post-filter SEI 14-26 message", Joint Video Expert Team (JVET) of ITU-T SG.16 WP3 and ISO/IEC JTC1/SC29/WG11, Document: JVET-Y0075-v1, 25th Meeting, by teleconference, Jan. 12, 2022, 4 pages.
Infrastructure of audiovisual services—Coding of moving video—"Versatile video coding", International Telecommunication Union, ITU-T Telecommunication Standardization Sector of ITU, Series H: Audiovisual and Multimedia Systems, Recommendation ITU-T H.266, 2022, 533 pages.
Bossen et al., "VVC Operation range extension (Draft 4)", Joint Video Expert Team (JVET) of ITU-T SG16 WP3 and ISO/IEC JTC1/SC29/WG11, Document: JVET-W2005-v2, 23rd Meeting, by teleconference, Jul. 7, 2021, 30 pages.
Alshina et al.,"JVET Common Test Conditions and evaluation procedures for neural network-based video coding technology", Joint Video Expert Team (JVET) of ITU-T SG16 WP3 and ISO/IEC JTC1/SC29/WG11, Document: JVET-X2016-v1, 24th Meeting, by teleconference, Oct. 6, 2021, 10 pages.
"Infrastructure of audiovisual services—Coding of moving video—Reference software for ITU-T H.265 high efficiency video coding", International Telecommunication Union, ITU-T Telecommunication Standardization Sector of ITU, Series H: Audiovisual and Multimedia Systems, Recommendation ITU-T H.265.2, Oct. 2014, 12 pages.
Wang, Ye-Kui, "AHG2: On specifying the range extensions profiles", Joint Video Experts Team (JVET) of Itu-T SG 16 WP 3 and ISO/IEC JTC 1/SC 29, Document: JVET-X0073-v2, 24th Meeting, by teleconference, Oct. 6, 2015, 8 pages.

* cited by examiner

VIDEO ENCODING AND DECODING USING OPERATIONS CONSTRAINT

CROSS REFERENCE TO RELATED APPLICATIONS

This application is a U.S. National Stage Application under 35 U.S.C. § 371 of International Patent Application No. PCT/EP2023/058834, filed Apr. 4, 2023, which is incorporated herein by reference in its entirety.

This application claims priority to European Application No. 22305528.6, filed on Apr. 12, 2022, which is incorporated herein by reference in its entirety.

TECHNICAL FIELD

At least one of the present embodiments generally relates to a method or an apparatus for video encoding or decoding, and more particularly, to a method or an apparatus implementing capability constraints comprising an indication relative to a number of multiply-accumulation operations needed to decode video stream.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

Recently developed methods (for instance neural network NN based methods) for coding and decoding can exhibit a huge number of multiply-accumulate (MAC) operations, leading to number of MACs much larger than what is required in conventional video coding solutions making decoder implementation more and more difficult. Therefore, there is a need to improve the state of the art.

SUMMARY

In the present application, the disclosed concepts are based on number of MAC operations used as complexity metric. It can be generalized to other complexity metrics, such as number of Operations (OPs), number of floating-point operations (FLOPs), number of uses per sample.

The drawbacks and disadvantages of the prior art are solved and addressed by the general aspects described herein.

According to a first aspect, a video stream is provided that comprises coded data representative of a sequence of images, an indication of a profile to which coded data conform among a plurality of profiles, and an indication of a level to which coded data conform among a plurality of levels; wherein the plurality of profiles and the plurality of levels specify capability constraints for decoding coded data and wherein the capability constraints comprise an indication relative to a number of multiply-accumulation operations needed to decode coded data.

According to a second aspect, there is provided a method. The method comprises determining an ability of the decoder to decode a video stream, wherein the video stream comprises coded data representative of a sequence of images, an indication of a profile to which coded data conform among a plurality of profiles, and an indication of a level to which coded data conform among a plurality of levels. The plurality of profiles and levels specify capability constraints for decoding conforming coded data and advantageously the capability constraints comprise an indication relative to a number of multiply-accumulation operations needed to decode coded data. The determining of the ability of a decoder to decode the video stream further comprises parsing the indication of the profile to which coded data conform; parsing the indication of the level to which coded data conform; and in response to the determining that the profile is supported by the decoder and that the level is supported by the decoder, determining that the decoder is able to implement a number of multiply-accumulation operations needed to decode coded data.

According to a third aspect, there is provided a method. The method comprises video decoding by first determining the ability of a decoder to decode a video stream according to any of the disclosed variants and in response to determining that the decoder is able to decode the video stream, decoding the video stream.

According to fourth aspect, there is provided a second method. The method comprises video encoding by generating a bitstream according to any of the disclosed embodiments and variants of the capability constraints that specify an indication relative to a number of multiply-accumulation operations needed to decode the generated bitstream.

According to another aspect, there is provided an apparatus. The apparatus comprises one or more processors, wherein the one or more processors are configured to implement the method for video decoding according to any of its variants. According to another aspect, the apparatus for video decoding comprises means for implementing any of the video decoding variants.

According to another aspect, there is provided another apparatus. The apparatus comprises one or more processors, wherein the one or more processors are configured to implement the method for video decoding according to any of its variants. According to another aspect, the apparatus for video decoding comprises means for implementing any of the video decoding variants.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising coded data representative of a sequence of images, an indication of a profile to which coded data conform among a plurality of profiles, and an indication of a level to which coded data conform among a plurality of levels; wherein the plurality of profiles and the plurality of levels specify capability constraints for decoding coded data and wherein the capability constraints comprise an indication relative to a number of multiply-accumulation operations needed to decode coded data.

According to another general aspect of at least one embodiment, there is provided a computer program product comprising instructions which, when the program is executed by a computer, cause the computer to carry out any of the described encoding/decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

In the drawings, examples of several embodiments are illustrated.

DETAILED DESCRIPTION

Various embodiments relate to a video coding system in which, in at least one embodiment, it is proposed to adapt video coding process to implement new operational constraints in normative video decoding process, in particular about the number of operations (MACs) needed in the decoding process. Different embodiments are proposed hereafter, introducing some signaling and conformance modifications to increase coding efficiency and improve the codec consistency when decoding method can exhibit a huge number of multiply-accumulate (MAC) operations. Amongst others, an encoding method, a decoding method, an encoding apparatus, a decoding apparatus based on this principle are proposed.

Moreover, the present aspects, although describing principles related to particular drafts of VVC (Versatile Video Coding) or to HEVC (High Efficiency Video Coding) specifications, or to ECM (Enhanced Compression Model) reference software are not limited to VVC or HEVC or ECM, and can be applied, for example, to other standards and recommendations, whether pre-existing or future-developed, and extensions of any such standards and recommendations (including VVC and HEVC and ECM). Unless indicated otherwise, or technically precluded, the aspects described in this application can be used individually or in combination.

The acronyms used herein are reflecting the current state of video coding developments and thus should be considered as examples of naming that may be renamed at later stages while still representing the same techniques.

Figure 1:
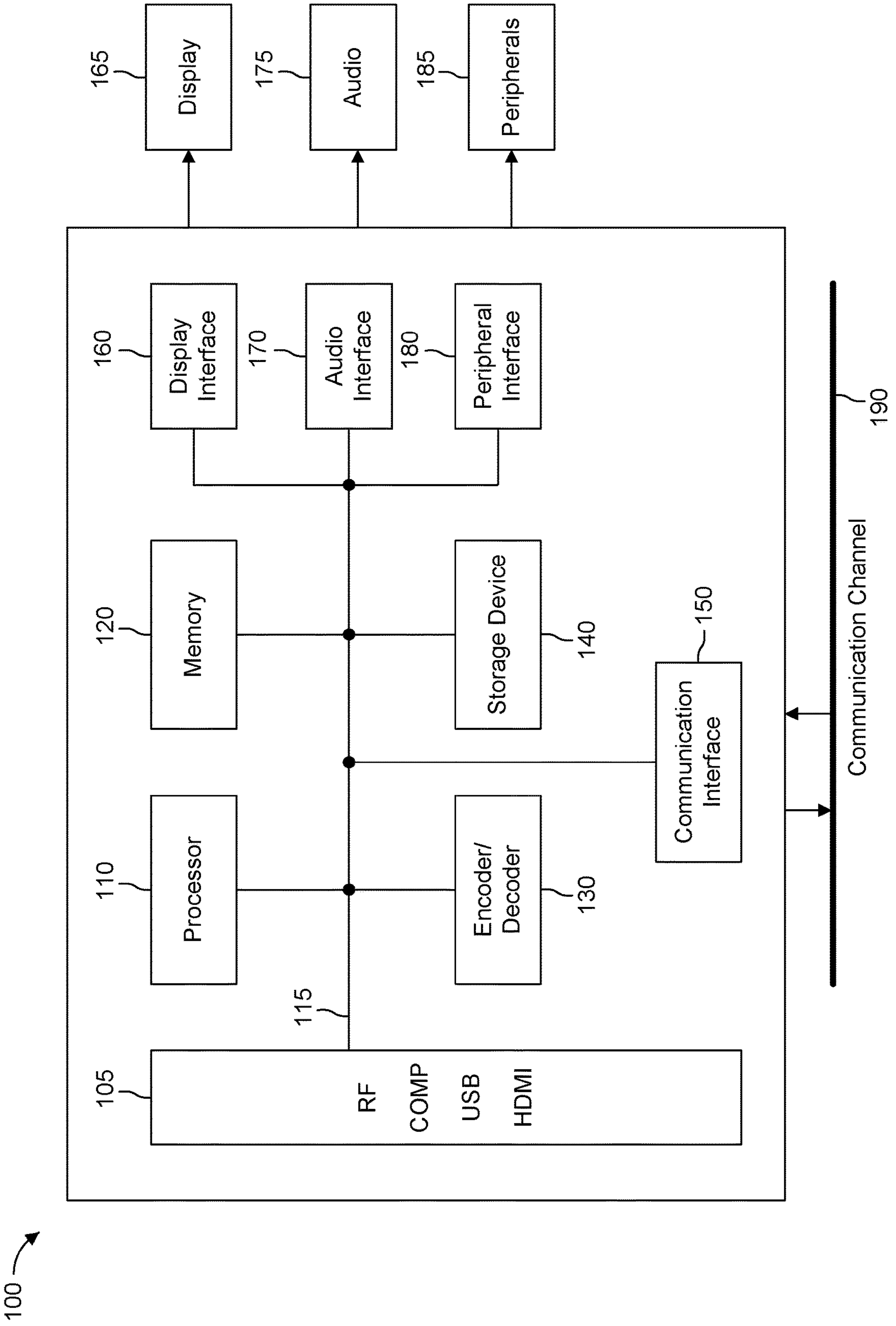
FIG. 1 illustrates a block diagram of an example apparatus in which various aspects of the embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g. a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the data stream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the 12C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
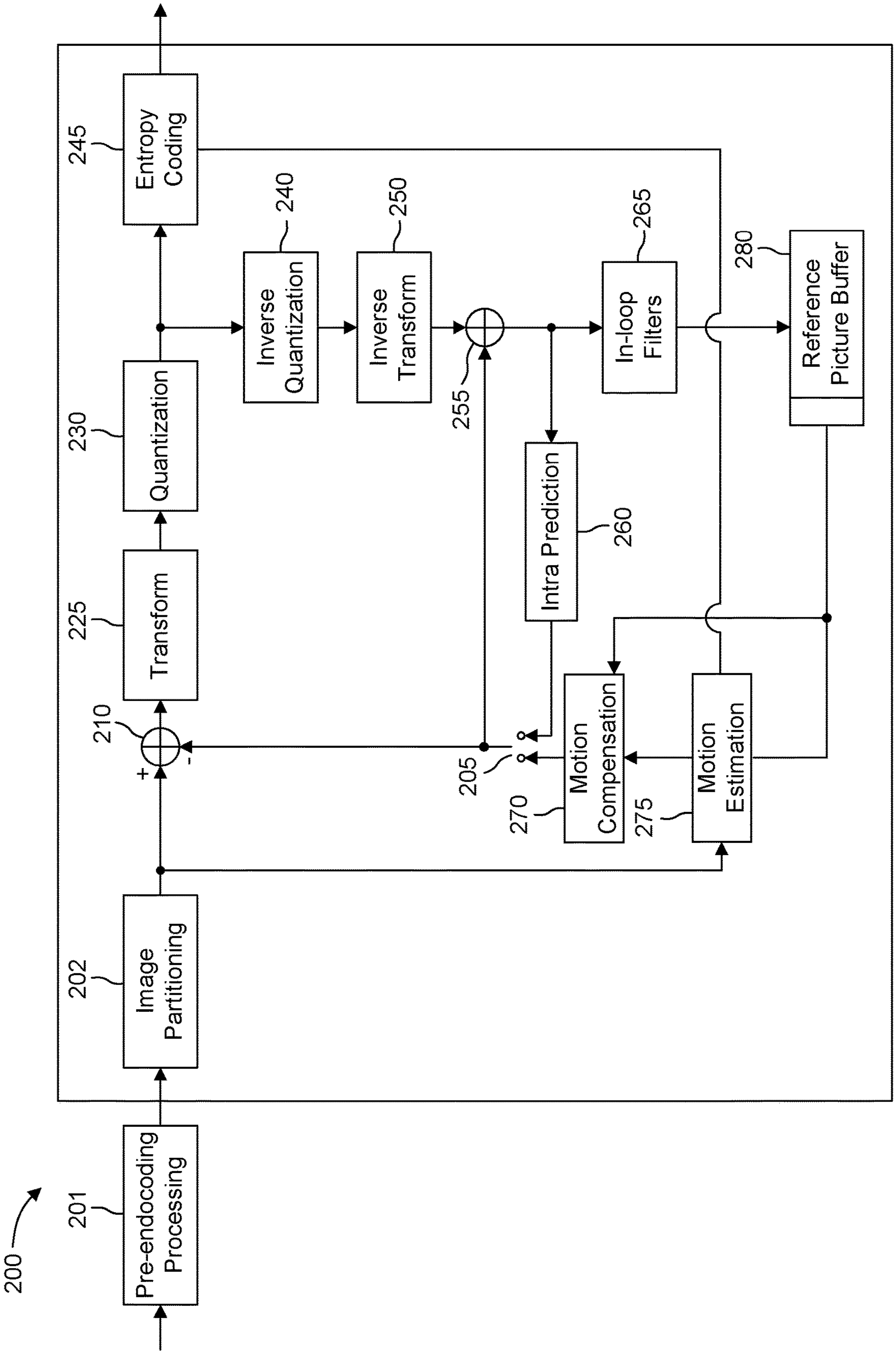
FIG. 2 illustrates a block diagram of an embodiment of video encoder in which various aspects of the embodiments may be implemented.

FIG. 2 illustrates an example video encoder 200, such as VVC (Versatile Video Coding) encoder. FIG. 2 may also illustrate an encoder in which improvements are made to the VVC standard or an encoder employing technologies similar to VVC.

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i. e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
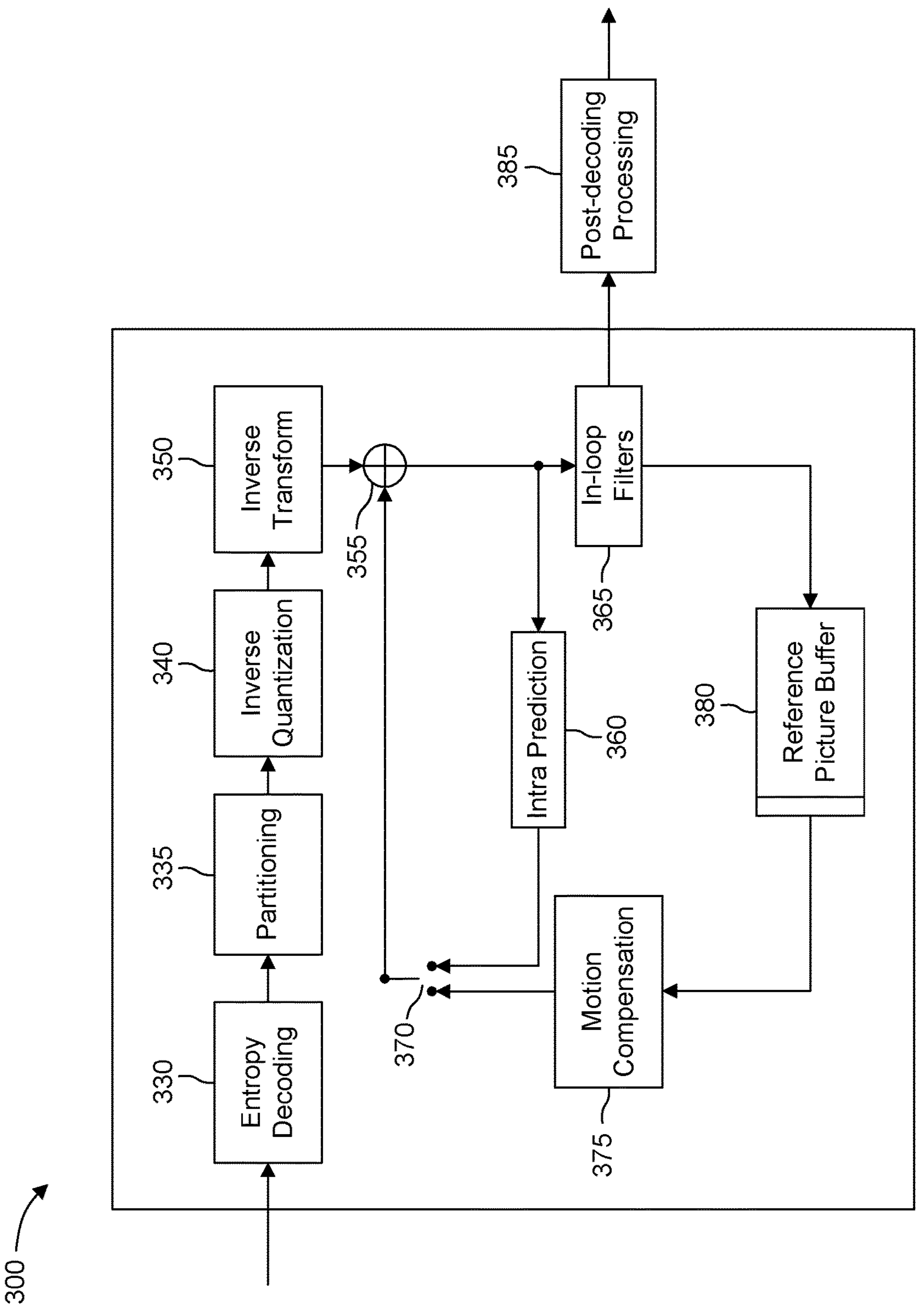
FIG. 3 illustrates a block diagram of an embodiment of video decoder in which various aspects of the embodiments may be implemented.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing can use metadata derived in the pre-encoding processing and signalled in the bitstream.

At least some embodiments relate to the specification of new operational constraints in a normative video decoding process. In common video coding standards, the decoding process is normatively described. In addition, normative constraints on the decoder capabilities are defined in profiles, tiers and levels. Profiles define set of tools to be supported by a normative decoder. For each profile, a set of levels is defined, a level specifying quantitative constraints about the maximum normative decoder capabilities, such as for instance the maximum luma sample rate (maximum number of luma samples per second to be processed and produced by the decoder), the maximum bitrate, the maximum picture resolution. An example of constraints specified in the VVC standard is depicted hereafter in Table 2. Constraints on the Maximum luma sample rate MaxLumaSr (in samples/sec) are for instance included in this table. Successive levels correspond in general to incremental capabilities: a decoder conforming a given level (for instance 5.0) also conforms all the lower levels (1.0 to 4.1). In addition, the concept of tier is also specified. A tier is a specified category of level constraints imposed on values of the syntax elements in the bitstream or values of variables. The level constraints are included within a tier and a decoder conforming to a certain tier and level would be capable of decoding all bitstreams that conform to the same tier or the lower tier of that level or any level below that level.

These constraints are used at encoder side to ensure that the encoded bitstream is conform to the profile/level targeted by the encoder. The encoder signals the profile and level information in the bitstream, for instance inside the Video Parameter Set (VPS) or Sequence Parameter Set (SPS), such as in VVC where a syntax structure (named "profile_tier_level( )", shown in Table 1) is inserted inside VPS and, optionally (depending on the SPS syntax element "sps_ptl_dpb_hrd_params_present_flag"), inside SPS. The structure profile_tier_level( ) comprises syntax elements indicative of the profile and level (for example, general_profile_idc, general_level_idc).

TABLE 1

Excerpt of the VVC "profile_tier_level" syntax.

| | Descriptor |
|---|---|
| profile_tier_level( profileTierPresentFlag, MaxNumSubLayersMinus1 ) { | |
| if( profileTierPresentFlag ) { | |
| **general_profile_idc** | u(7) |
| **general_tier_flag** | u(1) |
| } | |
| **general_level_idc** | u(8) |
| ... | |

The constraints are used at decoder side to determine the ability of the decoder to decode a video conforming to the profile/level signalled in the bitstream. If the decoder is not able to decode the video, the client that receives and decodes the video bitstream can ask for another version of the video (another bitstream) conforming a profile/level supported by the decoder. Different video decoders (hardware cores of a video decoder, or software implementations of a video decoder) may conform different profiles and levels. This means that one video decoder may be able to decode bitstreams conforming to a first given profile/level, while it may not be able to decode bitstreams conforming to a second given profile/level.

TABLE 2

Tier and level limits for the video profiles defined in VVC specification (Table 136).

| | Max luma sample rate | Max bit rate MaxBR (BrVclFactor or BrNalFactor bits/s) | | Min compression ratio MinCrBase | |
|---|---|---|---|---|---|
| Level | MaxLumaSr (samples/sec) | Main tier | High tier | Main tier | High tier |
| 1.0 | 552 960 | 128 | — | 2 | 2 |
| 2.0 | 3 686 400 | 1 500 | — | 2 | 2 |
| 2.1 | 7 372 800 | 3 000 | — | 2 | 2 |
| 3.0 | 16 588 800 | 6 000 | — | 2 | 2 |
| 3.1 | 33 177 600 | 10 000 | — | 2 | 2 |
| 4.0 | 66 846 720 | 12 000 | 30 000 | 4 | 4 |
| 4.1 | 133 693 440 | 20 000 | 50 000 | 4 | 4 |
| 5.0 | 267 386 880 | 25 000 | 100 000 | 6 | 4 |
| 5.1 | 534 773 760 | 40 000 | 160 000 | 8 | 4 |
| 5.2 | 1 069 547 520 | 60 000 | 240 000 | 8 | 4 |
| 6.0 | 1 069 547 520 | 60 000 | 240 000 | 8 | 4 |
| 6.1 | 2 139 095 040 | 120 000 | 480 000 | 8 | 4 |
| 6.2 | 4 278 190 080 | 240 000 | 800 000 | 8 | 4 |

In recent research works, neural network (NN) based decoder designs have been considered. This can be in the shape of coding tools based on NN, for example new intra prediction tools based on NN. Ultimately the solution is to replace the complete conventional design by a fully NN based design (e.g. auto-encoders). A main issue of NN-based solutions is that they involve a huge number of multiply-accumulate (MAC) operations, leading to number of MACs much larger than what is required in conventional video coding solutions (even in their most complex versions, such as the Exploratory Coding Model—ECM—being currently developed by JVET). Even for conventional coding solutions, trend is to complexify more and more the decoding process, making the implementation potentially more and more difficult.

It seems important given these new evolutions to integrate new capability constraints for decoders, in particular about the number of operations (MACs).

This is solved and addressed by the general aspects described herein, which are directed to defining a process allowing the decoder to determine whether it is capable of decoding a video stream based on new information related to number of operations (MACs) needed to decode video data of the video stream. The new information is typically defined as constraints specifying conformance bitstreams. These constraints are normative, meaning that an encoder has to ensure that constraints are satisfied given the profile/level it targets, and that a decoder satisfying a given the profile/level is able to decode bitstreams conforming to these constraints. Various embodiments and variants of the present principles comprise adding in levels new constraint on number of MACS such as constraint on the maximum number of MACS per second (maximum MACS rate), constraint on the maximum number of MACS per sample, constraint on the maximum ratio to a maximum samples rate (such as maximum Luma samples rate). Others various embodiments and variants of the present principles may comprise adding these different variants of the new constraint in specific MAC levels, i.e. independently from the levels commonly specified; defining constraints on number of MACS to NN tools only, to non NN tools only, to any type of tools; or decoupling maximum bitrate from resolution and adding an independent MACS/max bitrate constraint.

According to a first aspect of the at least one embodiment, a video stream is defined that comprises coded data representative of a sequence of images, an indication of a profile to which coded data conform among a plurality of profiles, and an indication of a level to which coded data conform among a plurality of levels; wherein the plurality of profiles and the plurality of levels specify capability constraints for decoding coded data and wherein the capability constraints comprise an indication relative to a number of multiply-accumulation operations needed to decode coded data.

Various Embodiments for Indicating a Number of Multiply-Accumulation Operations in Capability Constraints are Described in the Following.

According to first embodiment, a constraint on Maximum MACs rate is specified in levels table. Accordingly, each level among the plurality of levels defines at least a maximum multiplication-addition operations rate. Thus, it is proposed to define a video decoder configuration process, that is responsive to a parameter value indicative of a complexity level selected from a plurality of complexity levels, each complexity level defining at least a maximum multiplication-addition (MACs) operations rate (maximum number of kMACs per second). The maximum MACs rate can be indicated in a table defining different levels, as illustrated in Table 3 that is a modified version of Table.

TABLE 3

Level limits table for the video profiles, including maximum MACs rate, MaxMacsR.

| | Max MACs rate | Max luma sample rate | Max bit rate MaxBR (BrVclFactor or BrNalFactor bits/s) | | Min compression ratio MinCrBase | |
|---|---|---|---|---|---|---|
| Level | MaxMacsR (kMACs/sec) | MaxLumaSr (samples/sec) | Main tier | High tier | Main tier | High tier |
| 1.0 | 5 530 | 552 960 | 128 | — | 2 | 2 |
| 2.0 | 36 864 | 3 686 400 | 1 500 | — | 2 | 2 |
| 2.1 | 147 456 | 7 372 800 | 3 000 | — | 2 | 2 |
| 3.0 | 663 552 | 16 588 800 | 6 000 | — | 2 | 2 |
| 3.1 | 2 488 320 | 33 177 600 | 10 000 | — | 2 | 2 |

TABLE 3-continued

Level limits table for the video profiles, including maximum MACs rate, MaxMacsR.

| | Max MACs rate | Max luma sample rate | Max bit rate MaxBR (BrVclFactor or BrNalFactor bits/s) | | Min compression ratio MinCrBase | |
|---|---|---|---|---|---|---|
| Level | MaxMacsR (kMACs/sec) | MaxLumaSr (samples/sec) | Main tier | High tier | Main tier | High tier |
| 4.0 | 10 027 008 | 66 846 720 | 12 000 | 30 000 | 4 | 4 |
| 4.1 | 40 108 032 | 133 693 440 | 20 000 | 50 000 | 4 | 4 |
| 5.0 | 160 432 128 | 267 386 880 | 25 000 | 100 000 | 6 | 4 |
| 5.1 | 534 773 760 | 534 773 760 | 40 000 | 160 000 | 8 | 4 |
| 5.2 | 1 069 547 520 | 1 069 547 520 | 60 000 | 240 000 | 8 | 4 |
| 6.0 | 1 069 547 520 | 1 069 547 520 | 60 000 | 240 000 | 8 | 4 |
| 6.1 | 2 139 095 040 | 2 139 095 040 | 120 000 | 480 000 | 8 | 4 |
| 6.2 | 4 278 190 080 | 4 278 190 080 | 240 000 | 800 000 | 8 | 4 |

According to a second aspect of the at least one embodiment, a method (400) to determine the ability of a decoder to decode a video stream is disclosed.

Figure 4:
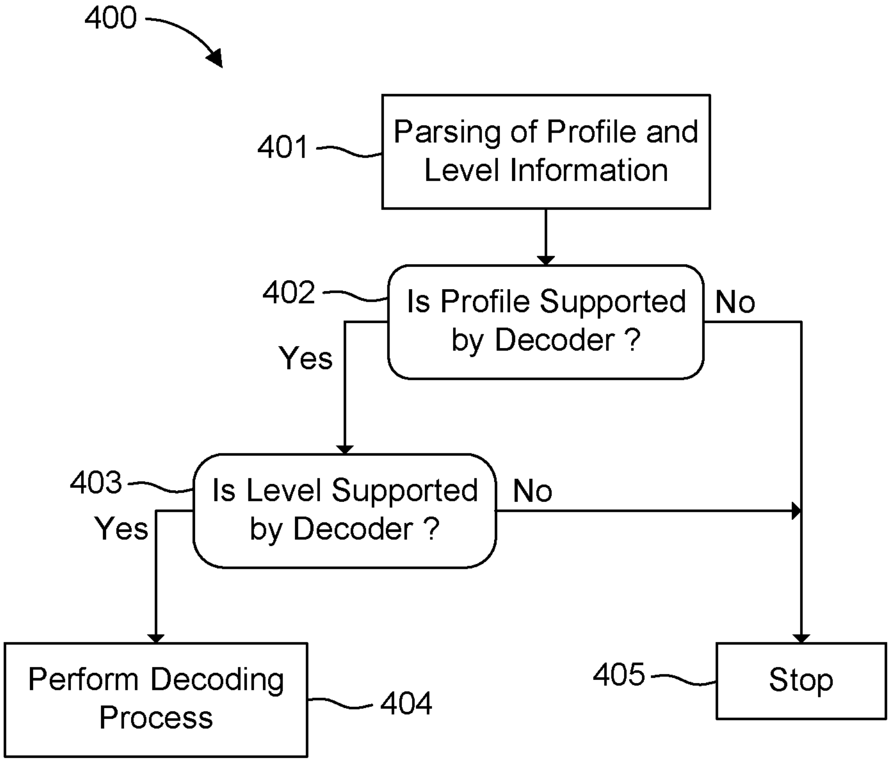
FIG. 4 illustrates a block diagram of a method to determine the ability of a decoder to decode a video stream according to a general aspect of at least one embodiment.

FIG. 4 illustrates a block diagram of a method 400 to determine the ability of a decoder to decode a video stream according to a general aspect of the first embodiment. In step 401, the decoder parses the information related to the profile and level signalled in the input bitstream and to which the coded video data conform. In step 402, the decoder checks whether the profile information decoded from the bitstream corresponds to a profile supported by the decoder. If the decoder supports the profile (yes), the decoder further checks in step 403 whether the level information decoded from the bitstream corresponds to a level supported by the decoder. If the decoder supports the level (yes), the decoder performs the decoding process of the bitstream in step 404. If the decoder does not support (No) the profile or the level, the process stops (step 405). According to a particular variant, not shown in FIG. 4, where the bitstream is transmitted via a streaming platform, if the decoder does not support (No) the profile or the level, the decoder (or receiver) may generate a message to the encoder (or transmitter) to request a bitstream with lower profile or level. In another variant, the decoder (or receiver) may select among a plurality of encoded bitstreams, an encoded bitstream that has a profile and a level conforming to the decoder capabilities.

According to second embodiment, a constraint on a ratio of a maximum MACs to a maximum samples rate is specified in levels table. Accordingly, each level among the plurality of levels defines at least a ratio of maximum multiplication-addition operations to the maximum samples rate. For instance, the constraint on the number of MACs is expressed as a ratio MaxMacsRatio to the maximum luma samples rate, as illustrated in Table 4. The maximum number of MACS per second (maximum MACS rate) is then derived as:

$$\text{MaxMacsR} = \text{MaxMacRatio} \times \text{MaxLumaSr}$$

TABLE 4

Level limits table for the video profiles, including maximum ratio to max luma samples rate, MaxMacsRatio.

| | | Max luma sample | Max bit rate MaxBR (BrVclFactor or BrNalFactor bits/s) | | Min compression ratio MinCrBase | |
|---|---|---|---|---|---|---|
| Level | Max MACs ratio MaxMacsRatio | rate MaxLumaSr (samples/sec) | Main tier | High tier | Main tier | High tier |
| 1.0 | 10 | 552 960 | 128 | — | 2 | 2 |
| 2.0 | 10 | 3 686 400 | 1 500 | — | 2 | 2 |
| 2.1 | 20 | 7 372 800 | 3 000 | — | 2 | 2 |
| 3.0 | 40 | 16 588 800 | 6 000 | — | 2 | 2 |
| 3.1 | 75 | 33 177 600 | 10 000 | — | 2 | 2 |
| 4.0 | 150 | 66 846 720 | 12 000 | 30 000 | 4 | 4 |
| 4.1 | 300 | 133 693 440 | 20 000 | 50 000 | 4 | 4 |
| 5.0 | 600 | 267 386 880 | 25 000 | 100 000 | 6 | 4 |
| 5.1 | 1 000 | 534 773 760 | 40 000 | 160 000 | 8 | 4 |
| 5.2 | 2 500 | 1 069 547 520 | 60 000 | 240 000 | 8 | 4 |
| 6.0 | 2 500 | 1 069 547 520 | 60 000 | 240 000 | 8 | 4 |
| 6.1 | 5 000 | 2 139 095 040 | 120 000 | 480 000 | 8 | 4 |
| 6.2 | 10 000 | 4 278 190 080 | 240 000 | 800 000 | 8 | 4 |

The decoder can proceed as described in FIG. 4.

According to third embodiment, a constraint on a number of multiply-accumulation operations is specified in a table of another type of levels. Accordingly, an indication (general_MAC_level_idc) of a multiply-accumulation operations level to which coded data conform among a plurality of multiply-accumulation operations levels is further specified in the bitstream. In a particular variant, each multiply-accumulation operations level among the plurality of multiply-accumulation operations levels defines at least a maximum multiplication-addition operations rate.

Advantageously, the information related to the maximum MACs rate is independent from the level information as known for instance from profiles, tiers and levels used in VVC. The MAC level is signalled using a different parameter than the level parameter. This is illustrated in Table 5 where the new syntax element general_MAC_level_idc is added underlined font.

TABLE 5

"profile_tier_level" syntax indicative of a new level index.

| | Descriptor |
|---|---|
| profile_tier_level( profileTierPresentFlag, MaxNumSubLayersMinus1 ) { | |
| if( profileTierPresentFlag ) { | |
| **general_profile_idc** | u(7) |
| **general_tier_flag** | u(1) |
| } | |
| **general_level_idc** | u(8) |
| <u>**general MAC level idc**</u> | u(8) |
| ... | |

This syntax element can have the following semantics, based on semantics already used in VVC for the syntax element general_level_idc:

general_MAC_level_idc indicates a level related to the MACs rate, to which OlsInScope (the Output Layer Set in scope) conforms as specified in Annex A. Bitstreams shall not contain values of general_MAC_level_idc other than those specified in Annex A (of VVC specification). Other values of general_MAC_level_idc are reserved for future use by ITU-T | ISO/IEC.

In this definition, the output layer set (OLS) is defined in VVC as a set of layers for which one or more layers are specified as the output layers, the video being possibly of 1 or more layers. The MAC level information general_MAC_level_idc is signalled in the bitstream, for instance inside the Video Parameter Set (VPS) or Sequence Parameter Set (SPS), such as in VVC where a syntax structure is inserted inside VPS and, optionally (depending on the SPS syntax element "sps_ptl_dpb_hrd_params_present_flag"), inside SPS.

An illustration of a table defining different MAC levels is provided in Table.

TABLE 6

Independent table comprising constraints related to the maximum MACs rate, MaxMacsR.

| MAC Level | Max MACs rate MaxMacsR (kMACs/sec) |
|---|---|
| 1.0 | 1 000 000 |
| 2.0 | 10 000 000 |
| 3.0 | 100 000 000 |
| 4.0 | 1 000 000 000 |
| 5.0 | 10 000 000 000 |
| 6.0 | 100 000 000 000 |

Figure 5:
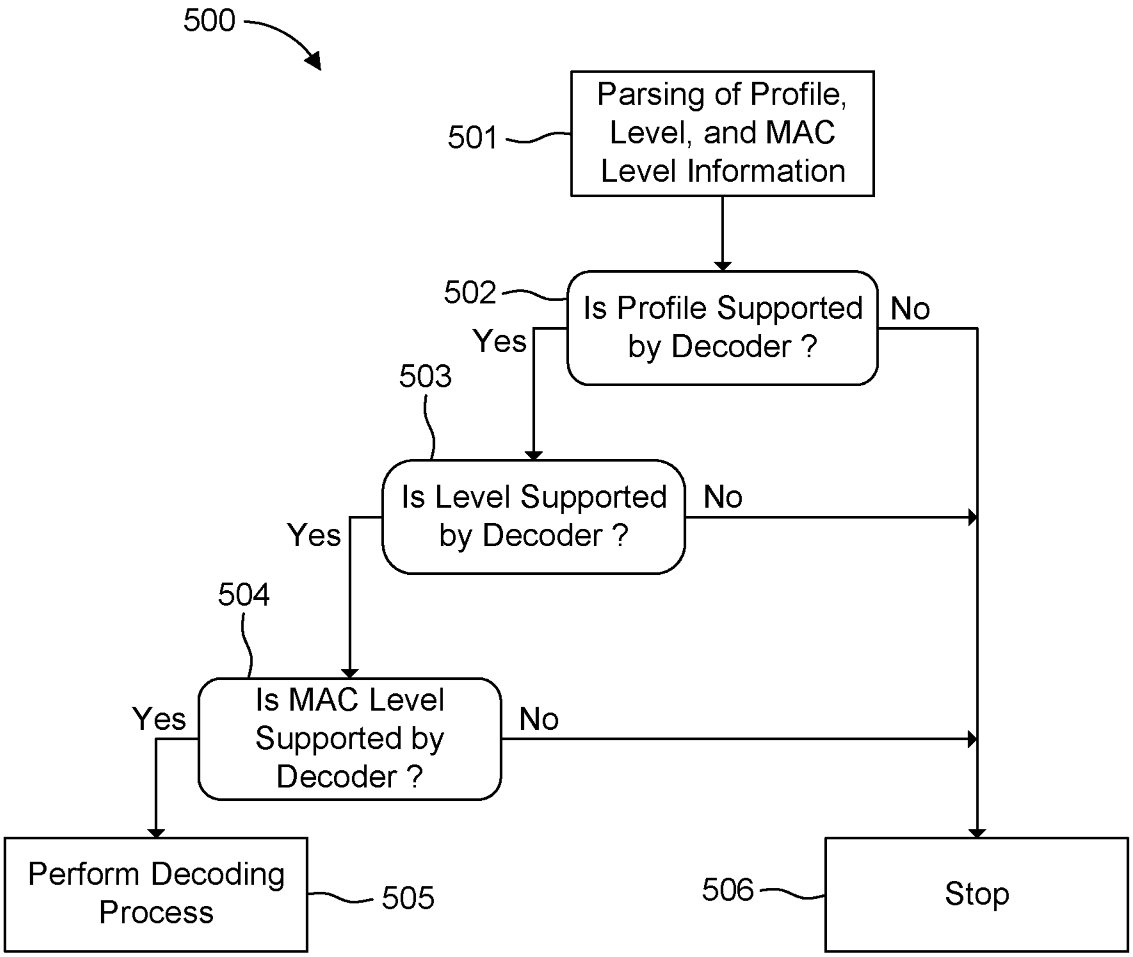
FIG. 5 illustrates a block diagram of to determine the ability of a decoder to decode a video stream according to a general aspect of at least one embodiment.

FIG. 5 illustrates a block diagram of a method 500 determining the ability of a decoder to decode a video stream according to a general aspect of the third embodiment. In step 501, the decoder decodes and parses the information related to the profile, level and MAC level signalled in the input bitstream. In step 502, the decoder checks whether the profile information decoded from the bitstream corresponds to a profile supported by the decoder. If the decoder supports the profile (yes), the decoder further checks in step 503 whether the level information decoded from the bitstream corresponds to a level supported by the decoder. If the decoder supports the level (yes), the decoder further checks in step 504 whether the MAC level information decoded from the bitstream corresponds to a MAC level supported by the decoder. If the decoder supports the MAC level (yes), the decoder performs the decoding process of the bitstream in step 505. If the decoder does not support the profile, the level or the MAC level, the process stops (step 506). According to different variants, the determining that the profile to which the coded data conforms is supported by the decoder, the determining that the level to which the coded data conforms is supported by the decoder, and the determining that the multiply-accumulation operations level to which the coded data conforms is supported by the decoder, are performed independently and in any order. According to different variants, the signalling of the profile to which the coded data conforms is supported by the decoder, the signalling of the level to which the coded data conforms is supported by the decoder, and the signalling of the multiply-accumulation operations level to which the coded data conforms is supported by the decoder, are performed independently and in any order.

Figure 6:
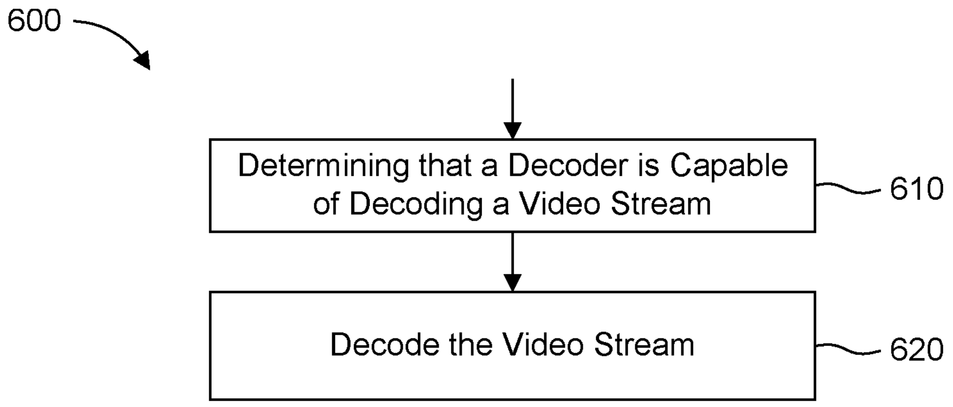
FIG. 6 illustrates a generic decoding method according to a general aspect of at least one embodiment.

FIG. 6 illustrates a generic decoding method 300 according to a general aspect of at least one embodiment. The block diagram of FIG. 6 partially represents modules of a decoder or decoding method, for instance implemented in the exemplary decoder of FIG. 3. Although not explicitly described, the skilled in the art will unambiguously derive the generic decoding embodiment to any of the embodiments or variants of the capability constraints described herein. Thus, for instance in a step 610, the determining of the ability of a decoder to decode a video stream conforming to capability constraints including a number of MAC operations is processed based on the profile and level signalled in the bitstream and compared to the decoder capabilities. In response to determining that the decoder is able to decode the bitstream, the bitstream is decoded in 620. According to a particular variant, not shown in FIG. 6, in response that the decoder is not able to decode the bitstream, the decoder (or receiver) may further generate a message to an encoder (or transmitter) to request a bitstream with lower profile or level.

As for the third embodiment, according to fourth embodiment, a constraint on a number of multiply-accumulation operations is specified in a table of another type of levels. In a particular feature of the fourth embodiment, each multiply-accumulation operations level among the plurality of multiply-accumulation operations levels defines at least a ratio of maximum multiplication-addition operations to a maximum samples rate. For instance, the information related to the maximum number of MACs is defined as a ratio related to the Max luma sample rate (MaxLumaSr) expressed in samples/sec. The constraint can, as for the third embodiment, be independent from the level information, and controlled by another type of level information such as general_MAC_level_idc. The maximum MACs rate (MACs per second) MaxMacsR can then be computed as follows:

$$MaxMacsR = MaxMacRatio \times MaxLumaSr$$

An illustration of a table defining different MAC levels is provided in table 7. Numbers in this table are indicative.

TABLE 7

| Independent table comprising constraints related to the maximum ratio to max luma samples rate, MaxMacsRatio. | |
|---|---|
| MAC Level | Max MACs ratio MaxMacsRatio |
| 1.0 | 10 |
| 2.0 | 40 |
| 3.0 | 150 |
| 4.0 | 600 |
| 5.0 | 2 500 |
| 6.0 | 10 000 |

The decoder can proceed as described in FIG. 5.

As for the third embodiment, according to fifth embodiment, a constraint on a number of multiply-accumulation operations is specified in a table of another type of levels. In a particular feature of the fifth embodiment, each multiply-accumulation operations level among the plurality of multiply-accumulation operations levels defines at least a maximum multiplication-addition operations per sample. Hence, the information related to the maximum number of MACs is defined as maximum number of MACs per sample, MaxMacsPerSamp, not per second. Advantageously, this constraint imposes that, for each sample to process, the maximum number of MAC is constrained to be lower than the value MaxMacsPerSamp. This is different from the previous embodiment, where the constraint is global (only concerns the maximum rate expressed in MAC/s) and does not applying to each sample (maximum number of MAC/sample). As previously, the constraint can as before be independent from the level information, and controlled by another type of level information such as general_MAC_level_idc. The maximum MACs rate (in MACs per second) MaxMacsR can then be computed as follows (for the luma samples):

$$MaxMacsR = MaxMacsPerSamp \times MaxLumaSr$$

An illustration of a table defining different MAC levels is provided in Table 8. Numbers in this table are indicative.

TABLE 8

| Independent table comprising constraints related to the maximum number of MACs per sample. | |
|---|---|
| MAC Level | Max MACs per sample MaxMacsPerSamp |
| 1.0 | 10 |
| 2.0 | 40 |
| 3.0 | 150 |
| 4.0 | 600 |
| 5.0 | 2500 |
| 6.0 | 10 000 |

The decoder can proceed as described in FIG. 5.

According to a sixth embodiment, a constraint on a number of multiply-accumulation operations is specified for all or only a part of the decoding process. Accordingly, a number of multiply-accumulation operations needed to decode coded data applies to part of decoding steps or to all decoding steps. Hence, the constraints associated to the number of MACs apply to part or all the steps involved in the decoding process, whatever the type of the step (based on NN or not). The total number of MACs involved by each considered step (in the worst case) must be counted and compared to the constraint to check if the level, or MAC level, is satisfied. The encoding process that generates a conformance bitstream must ensure that the total number of MACs after decoding data at a given granularity, such as an Access Unit, or a picture, or a slice, or at each intra period, or for a given time period, of for a number of successive pictures in decoding order, or in display order, is lower to the maximum number of MACs defined by the constraint. A high-level parameter inserted in for example the SPS or the PPS, can indicate the granularity to which the total number of MACs is associated. The total number of MACs can be counted as follows by the encoder. A global parameter totalMacsNb is set to 0 at the beginning of the decoding data at the given granularity. For each step involved in the decoding process that is inside the encoding process (e.g. step 240,245,250,260,265,270) for which the number of MACs has to be taken into account, totalMacsNb is incremented by the number of MACs involved in this step. The encoder must ensure that totalMacsNb obtained at the end of the encoding of an Access Unit, or a picture, or a slice, or at each intra period (depending on the granularity at which the constraint is expressed), totalMacsNb respects the constraint on the maximum number of MACs. This process can be described in the section related to the Hypothetical Reference Decoder specified in the decoder specification (for instance Annex C.5 of VVC specification). An example of specification text is given below, in which two tools are taken as example, ALF.

```
Example of specification text {
Each time clause 8.8.5.2 is invoked, the following applies:
  totalMacsNb = totalMacsNb + K0 * ( 1 << CtbLog2SizeY ) × ( 1 << CtbLog2SizeY )
Each time clause 8.8.5.4 is invoked, the following applies:
  totalMacsNb = totalMacsNb + K1 * ( ( 1 << CtbLog2SizeY ) / SubWidthC ) ×
      ( ( 1 << CtbLog2SizeY ) / SubHeightC )
Each time clause 8.8.5.7 is invoked, the following applies:
  totalMacsNb = totalMacsNb + K2 * ( ( 1 << CtbLog2SizeY ) / SubWidthC ) ×
        ( ( 1 << CtbLog2SizeY ) / SubHeightC )
```

Note that in the VVC specification, clause 8.8.5.2 describes the ALF filtering of luma samples of a CTB, clause 8.8.5.4 describes the ALF filtering of chroma samples of a CTB, clause 8.8.5.7 describes the CC-ALF filtering of chroma samples of a CTB. Parameters K0, K1, K2 are pre-defined values corresponding to the number of MACs per sample required by these steps. For example, K0=K1=K2=16.

}End example of specification text

According to a seventh embodiment, a constraint on a number of multiply-accumulation operations is specified for part of decoding steps implementing neural network processing. Thus, the constraints associated to the number of MACs does not relate to the entire decoding process, but only to steps of the decoding process involving NN-based operations. The total number of MACs involved by these specific steps must be counted and compared to the constraint to check if the level, or MAC level, is satisfied.

The NN-based operations must be normatively identified in the decoding process, and the number of MACs of each of the identified NN-based operations must be summed-up.

For instance, in VVC, Matrix-based intra prediction can be considered as a shallow NN based tool. According to a particular variant, if the decoder does not support the constraints involving NN-based operations, the decoder may disable such tools. In a variant, the decoder (or receiver) may generate a message to the encoder (or transmitter) to request an encoded bitstream that does not implement such NN-tools at the decoding. In another variant, the decoder (or receiver) may select among a plurality of encoded bitstreams, an encoded bitstream that does not implement such NN-tools at the decoding.

According to a eighth embodiment, separate constraints on a number of multiply-accumulation operations are specified depending on the type of decoding process. For instance, the type of decoding process can be defined according to NN or non-NN implementation. Thus, in a particular feature, a first indication (general_MAC_levelA_idc) relative to a number of multiply-accumulation operations needed to decode coded data applies to part of decoding steps implementing neural network processing and a second indication (general_MAC_levelB_idc) relative to a number of multiply-accumulation operations needed to decode coded data applies to part of decoding steps not implementing neural network processing. Advantageously, in this embodiment, different constraints associated to the number of MACs are defined depending on the type of the steps involved in the decoding process. A first set of MAC levels (MAC level A) is defined for all or part of the steps of the decoding process involving NN-based operations (steps of type A). A second set of MAC levels (MAC level B) is defined for all or part of the steps of the decoding process involving non NN-based operations (steps of type B). Table 9 illustrates the syntax change, with 2 new syntax elements "general_MAC_levelA_idc" and "general_MAC_levelB_idc".

TABLE 9

Modified "profile_tier_level" syntax with 2 new syntax elements indicative of 2 new levels indexes.

| | Descriptor |
|---|---|
| profile_tier_level( profileTierPresentFlag, MaxNumSubLayersMinus1 ) { | |
| if( profileTierPresentFlag ) { | |
| **general_profile_idc** | u(7) |
| **general_tier_flag** | u(1) |
| } | |

TABLE 9-continued

Modified "profile_tier_level" syntax with 2 new syntax elements indicative of 2 new levels indexes.

| | Descriptor |
|---|---|
| **general_level_idc** | u(8) |
| **general MAC levelA idc** | u(8) |
| **general MAC levelB idc** | u(8) |
| ... | |

According to a ninth embodiment, separate constraints on a number of multiply-accumulation operations are specified for out-of-loop post-decoding process. As for the eighth embodiment, separate constraints associated to the number of MACs are defined for out-of-loop processes, such as post-decoding filtering, post-decoding resampling, post-decoding film grain synthesis, post-decoding video enhancement, post-decoding dynamic range adaptation (tone mapping or inverse tone mapping).

According to a tenth embodiment, constraints between resolution, bitrate and MACS are decorrelated. In non-broadcast application, the notion of level, which sets a maximum bitrate limit (with main or high tiers) for a given resolution is in fact ignored by many service providers. To overcome this arbitrary set limit, a service provider may choose to signal a higher level allowing for a higher bitrate and scaling down the resolution through different control mechanisms.

In a first variant of this embodiment, 3 independent syntax parameters are defined as follow and replace both the tier and level parameters for instance defined in VVC as shown in table 10 (added syntax elements are underlined):

TABLE 10

3 independent syntax parameters inserted in a higher level of signalling than profiles/tiers/levels.

| | |
|---|---|
| **general_profile_idc** | u(7) |
| **general resolution idc** | u(8) |
| **general bitrate idc** | u(8) |
| **general MAC idc** | u(8) |

Where general_resolution_idc indicates a maximum resolution corresponding to Max luma sample rate MaxLumaSr (samples/sec) in Table 2. In this scenario, the maximum number of slices and tiles, is inferred from the general_resolution_idc.

Where general_bitrate_idc indicates a maximum bitrate corresponding to Max bit rate MaxBR (BrVclFactor or BrNalFactor bits/s) in Table 2.

Where general_MAC_idc can be define as per any of the previous embodiments.

However, it can be difficult for a conforming decoder to handle an unbounded number of combinations.

In a second variant of this embodiment, "level" and "tiers" are further constrained by new syntax elements. According to a particular feature, the notion of levels is further constrained by 3 syntax elements: Resolution, bitrate and MACS. The below table 11 illustrates the syntax change with new syntax elements (underlined) when the notion of level is further constrained:

TABLE 11

| 3 independent syntax parameters inserted in addition to profiles/levels. | |
|---|---|
| | Descriptor |
| profile_tier_level( profileTierPresentFlag, MaxNumSubLayersMinus1 ) { | |
| if( profileTierPresentFlag ) { | |
| **general_profile_idc** | u(7) |
| **general_tier_flag** | u(1) |
| } | |
| **general_level_idc** | u(8) |
| **general resolution idc** | u(8) |
| **general bitrate idc** | u(8) |
| **general MAC idc** | u(8) |
| ... | |

Where general_resolution_idc indicates a maximum resolution corresponding to Max luma sample rate MaxLumaSr (samples/sec). When absent, the MaxLumaSr is as defined in table 2. When present, its value indicates a lower resolution (max luma sample rate described in table 2) corresponding to a lower level.

Where general_bitrate_idc indicates a maximum bitrate corresponding to Max bit rate MaxBR (BrVclFactor or BrNalFactor bits/s). When absent, the MaxBR is as defined in table 2. When present, its value indicates a lower MaxBR corresponding to a lower level and/or Tiers described in table 2. Note that the value for general_resolution_idc and general_bitrate_idc are not necessarily correlated (hence differs from the notion of Level).

Where general_MAC_idc can be defined as per any of the previous embodiments.

According to an eleventh embodiment, a generic encoding method 200 is disclosed that generates a bitstream conforming to capability constraints according to any of its embodiments or variants. Although not explicitly described, the skilled in the art will unambiguously be able to derive the generic encoding embodiment to a particular embodiment described herein.

At the encoding process, when the encoder performs the generation of the bitstream conforming to a specified profile/level, it needs to insert in the bitstream the parameters related to the profile, level, to communicate them to the decoding side. The encoder therefore signals indicators related to the profile, level, and if relevant, MAC level, or, if relevant, MAC level A and MAC level B, ensuring that a decoder conforming this profile, level, and if relevant, MAC level, or, if relevant, MAC level A and MAC level B, is able to decode the bitstream.

Figure 7:
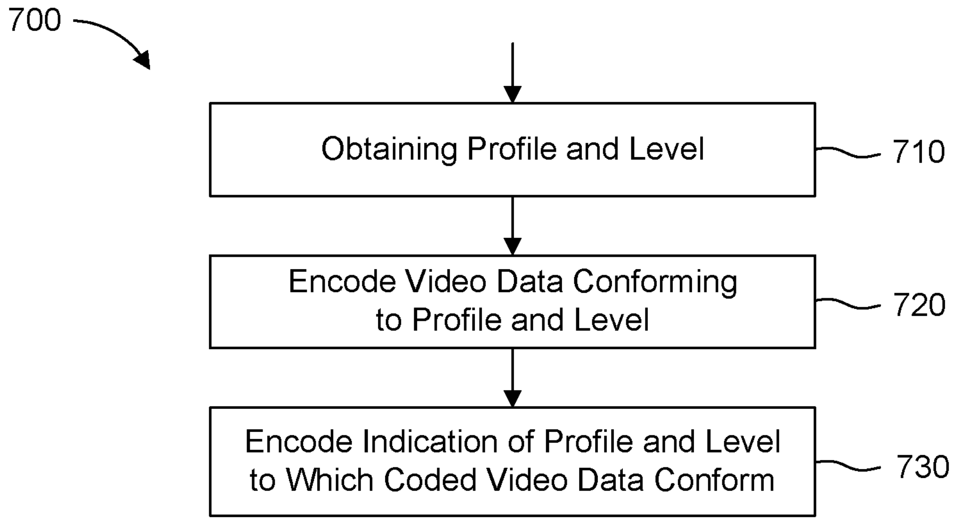
FIG. 7 illustrates a generic encoding method according to a general aspect of at least one embodiment.

FIG. 7 illustrates a generic encoding method 200 according to a general aspect of at least one embodiment. The block diagram of FIG. 7 partially represents modules of an encoder or encoding method, for instance implemented in the exemplary encoder of FIG. 2. In a step 710, profile and level to which coded data should conform are obtained among the plurality of profiles and levels. According to a salient feature, the plurality of profiles and levels specify capability constraints for decoding conforming coded data, wherein the capability constraints comprise an indication relative to a number of multiply-accumulation operations needed to decode coded data in any of the variants observed herein. Then in 720, a sequence of images is encoded according to the selected profile and level. An indication (such as general_profile_idc) of the profile to which coded data conform; and an indication (such as general_level_idc or any of its variants) of a level to which coded data conform are further encoded (730) in the bitstream to allow a decoder to determine whether it is able to decode the bitstream.

According to a twelfth embodiment, separate constraints on a number of multiply-accumulation operations are specified for display processing. According to a particular variant, the capability constraints comprise an indication relative to a number of multiply-accumulation operations needed for NN-based display processing. According to another particular variant, the video stream further comprises an indication of a maximum multiplication-addition operations rate needed for NN-based display processing. According to yet another particular variant, the indication of a maximum multiplication-addition operations rate needed for NN-based display processing is embedded in a SEI message.

Specifying constraint on MACs rate or number of MACs per sample for NN-based display processing is advantageous for display processing such as super-resolution, filtering, edge enhancement. The constraint to which a bitstream conforms to can be signalled as metadata in for instance an SEI message. The SEI message comprises a syntax element max_MACS_rate indicative of the maximum number of MACS per second that the device that will apply the display process has to support at maximum. Alternatively, the SEI message comprises a syntax element max_MACS_per_sample indicative of the maximum number of MACS per sample that the device that will apply the display process has to support at maximum.

Alternatively, the SEI message comprises 2 syntax elements, one related to the maximum number of samples per second max samples_rate, plus one syntax element indicating a maximum ratio related to the max samples rate, max_MACS_ratio, indicative of the maximum MACS rate. The maximum MACS rate is derived as (max_samples_rate*max_MACS_ratio).

Additional Embodiments and Information

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art. Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein are descriptive terms. As such, they do not preclude the use of other syntax element names.

The implementations and aspects described herein may be implemented as various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

SDP (session description protocol), a format for describing multimedia communication sessions for the purposes of session announcement and session invitation, for example as described in RFCs and used in conjunction with RTP (Real-time Transport Protocol) transmission;

DASH MPD (Media Presentation Description) Descriptors, for example as used in DASH and transmitted over HTTP, a Descriptor is associated to a Representation or collection of Representations to provide additional characteristic to the content Representation;

RTP header extensions, for example as used during RTP streaming;

ISO Base Media File Format, for example as used in OMAF and using boxes which are object-oriented building blocks defined by a unique type identifier and length also known as 'atoms' in some specifications;

HLS (HTTP live Streaming) manifest transmitted over HTTP. A manifest can be associated, for example, to a version or collection of versions of a content to provide characteristics of the version or collection of versions.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Further, the disclosed concepts are based on number of MAC operations used as complexity metric. The skilled in the art will unambiguously derive other complexity metrics from the present disclosure, such as number of Operations (OPs), number of floating-point operations (FLOPs), number of uses per sample.

We describe a number of embodiments. Features of these embodiments can be provided alone or in any combination, across various claim categories and types. Further, embodiments can include one or more of the following features, devices, or aspects, alone or in any combination, across various claim categories and types:

- A bitstream or signal that includes one or more of the described syntax elements, constraints files or variations thereof.
- A bitstream or signal that includes syntax conveying information generated according to any of the embodiments described.
- Inserting in the signalling syntax elements or constraints files that enable the decoder to process in a manner compliant to that used by an encoder.
- Creating and/or transmitting and/or receiving and/or decoding a bitstream or signal that includes one or more of the described syntax elements, constraints files, or variations thereof.
- Creating and/or transmitting and/or receiving and/or decoding according to any of the embodiments described.
- A method, process, apparatus, medium storing instructions, medium storing data, or signal according to any of the embodiments described.
- A TV, set-top box, cell phone, tablet, or other electronic device that performs a capability constraint checking process according to any of the embodiments described.
- A TV, set-top box, cell phone, tablet, or other electronic device that performs a capability constraint checking according to any of the embodiments described, and that displays (e.g. using a monitor, screen, or other type of display) a resulting image.
- A TV, set-top box, cell phone, tablet, or other electronic device that selects (e.g. using a tuner) a channel to receive a signal including an encoded image, and performs a capability constraints checking according to any of the embodiments described.
- A TV, set-top box, cell phone, tablet, or other electronic device that receives (e.g. using an antenna) a signal over the air that includes an encoded image, and performs a capability constraints checking according to any of the embodiments described.

The invention claimed is:

1. A method, implemented in a decoder, comprising:

determining an ability of the decoder to decode a video stream, wherein the video stream comprises coded data representative of a sequence of images, an indication of a profile to which coded data conform among a plurality of profiles, and an indication of a level to which coded data conform among a plurality of levels;

wherein for a current profile, a table specifies for each level quantitative constraints about a maximum normative for decoder capabilities for decoding conforming coded data, and wherein the table comprises an indication relative to a number of multiply-accumulation operations needed to decode coded data;

the determining of the ability of the decoder to decode the video stream further comprising:

parsing the indication of the profile to which coded data conform;

parsing the indication of the level to which coded data conform; and in response to the determining that the profile is supported by the decoder and that the level is supported by the decoder, determining that the decoder is able to implement a number of multiply-accumulation operations needed to decode coded data.

2. The method of claim 1, wherein each level among the plurality of levels defines at least a maximum multiplication-addition operations rate.

3. The method of claim 1, wherein each level among the plurality of levels defines at least a ratio of maximum multiplication-addition operations to a maximum samples rate.

4. The method of claim 1, wherein the video stream further comprises an indication of a multiply-accumulation operations level to which coded data conform among a plurality of multiply-accumulation operations levels.

5. The method of claim 4, wherein the determining of the ability of the decoder to decode the video stream further comprises:

parsing the indication of a multiply-accumulation operations level to which coded data conform; and in response to the determining that the multiply-accumulation operations level is supported by the decoder, determining that the decoder is able to implement a number of multiply-accumulation operations needed to decode coded data.

6. The method of claim 5, further comprising decoding the indication of a multiply-accumulation operations level to which coded data conform from the video stream.

7. The method of claim 5, wherein the determining that the profile to which the coded data conforms is supported by the decoder, the determining that the level to which the coded data conforms is supported by the decoder, and the determining that the multiply-accumulation operations level to which the coded data conforms is supported by the decoder are performed independently and in any order.

8. The method of claim 4, wherein each multiply-accumulation operations level among the plurality of multiply-accumulation operations levels defines at least a maximum multiplication-addition operations rate.

9. The method of claim 4, wherein each multiply-accumulation operations level among the plurality of multiply-accumulation operations levels defines at least a ratio of maximum multiplication-addition operations to a maximum samples rate.

10. The method of claim 4, wherein each multiply-accumulation operations level among the plurality of multiply-accumulation operations levels defines at least a maximum multiplication-addition operations per sample.

11. The method of claim 1, wherein the indication relative to a number of multiply-accumulation operations needed to decode coded data apply to part of decoding steps or to all decoding steps.

12. The method of claim 1, wherein the indication relative to a number of multiply-accumulation operations needed to decode coded data apply to part of decoding steps implementing neural network processing.

13. The method of claim 1, wherein the indication relative to a number of multiply-accumulation operations needed to decode coded data comprises a first indication relative to a number of multiply-accumulation operations needed to decode coded data apply to part of decoding steps implementing neural network processing and a second indication relative to a number of multiply-accumulation operations needed to decode coded data apply to part of decoding steps not implementing neural network processing.

14. The method of claim 1, wherein the indication relative to a number of multiply-accumulation operations needed to decode coded data apply to post-processing part of decoding steps.

15. The method of claim 1, wherein the table comprises an indication relative to a number of multiply-accumulation operations needed for NN-based display processing.

16. The method of claim 15, wherein the video stream further comprises an indication of a maximum multiplication-addition operations rate needed for NN-based display processing.

17. The method of claim 16, wherein the indication of a maximum multiplication-addition operations rate needed for NN-based display processing is embedded in a SEI message.

18. A decoder for video decoding a video stream, the decoder comprising:

one or more processors and at least one memory, wherein the video stream comprises coded data representative of a sequence of images, an indication of a profile to which coded data conform among a plurality of profiles, and an indication of a level to which coded data conform among a plurality of levels, and wherein for a current profile, a table specifies for each level quantitative constraints about a maximum normative for decoder capabilities for decoding conforming coded data, and wherein the table comprises an indication relative to a number of multiply-accumulation operations needed to decode coded data;

wherein the one or more processors is configured to:

determine the ability of the decoder to decode the video stream by:

parsing the indication of the profile to which coded data conform;

parsing the indication of the level to which coded data conform;

in response to determining that the profile is supported by the decoder and that the level is supported by the decoder, determining that the decoder is able to implement a number of multiply-accumulation operations needed to decode coded; and in response to determining that the decoder is able to decode the video stream, decode the video stream.

19. The decoder of claim 18, wherein each level among the plurality of levels defines at least a maximum multiplication-addition operations rate.

20. The decoder of claim 18, wherein each level among the plurality of levels defines at least a ratio of maximum multiplication-addition operations to a maximum samples rate.

* * * * *